US010374410B2

(12) United States Patent
Niehoff

(10) Patent No.: US 10,374,410 B2
(45) Date of Patent: Aug. 6, 2019

(54) AUTOMATIC RECLOSING ALTERNATING CURRENT CIRCUIT BREAKER

(71) Applicant: EATON INDUSTRIES (NETHERLANDS) B.V., Hengelo (NL)

(72) Inventor: Ronaldus Niehoff, Oldenzaal (NL)

(73) Assignee: EATON INTELLIGENT POWER LIMITED, Dublin (IE)

( * ) Notice: Subject to any disclaimer, the term of this patent is extended or adjusted under 35 U.S.C. 154(b) by 452 days.

(21) Appl. No.: 15/101,441

(22) PCT Filed: Dec. 4, 2014

(86) PCT No.: PCT/EP2014/076606
§ 371 (c)(1),
(2) Date: Jun. 3, 2016

(87) PCT Pub. No.: WO2015/082632
PCT Pub. Date: Jun. 11, 2015

(65) Prior Publication Data

US 2016/0301200 A1 Oct. 13, 2016

(30) Foreign Application Priority Data

Dec. 4, 2013 (GB) .................................. 1321401.0

(51) Int. Cl.
*H02H 3/06* (2006.01)
*H02H 3/02* (2006.01)
*H02H 3/08* (2006.01)

(52) U.S. Cl.
CPC .............. *H02H 3/06* (2013.01); *H02H 3/021* (2013.01); *H02H 3/08* (2013.01)

(58) Field of Classification Search
CPC ............. H01H 1/226; H01H 2009/543; H01H 2009/546; H01H 2033/146;
(Continued)

(56) References Cited

U.S. PATENT DOCUMENTS 1,796,817 A * 3/1931 Walty ...................... H02H 3/07 361/60
3,543,047 A * 11/1970 Renfrew ................. H01H 9/54 361/11
(Continued)

FOREIGN PATENT DOCUMENTS

CN 101710685 A 5/2010
CN 101752148 A 6/2010
(Continued)

*Primary Examiner* — Thienvu V Tran
*Assistant Examiner* — Nicolas Bellido
(74) *Attorney, Agent, or Firm* — Leydig, Voit & Mayer, Ltd.

(57) ABSTRACT

An alternating current circuit breaker has a first galvanic separation switch and a bypass switch in a live line, a second galvanic separation switch in the neutral line, and a semiconductor switch element connected parallel to the bypass switch. A processing unit is arranged to control the first and second galvanic separation switch, the bypass switch and the semiconductor switch element. A short circuit and overcurrent detection unit is connected to the processing unit for determining a short circuit situation or overcurrent situation. The processing unit is further arranged to execute a reclosing attempt after a certain time period after tripping of the circuit breaker, wherein the time period is dependent on the type of situation causing the tripping of the circuit breaker.

14 Claims, 1 Drawing Sheet

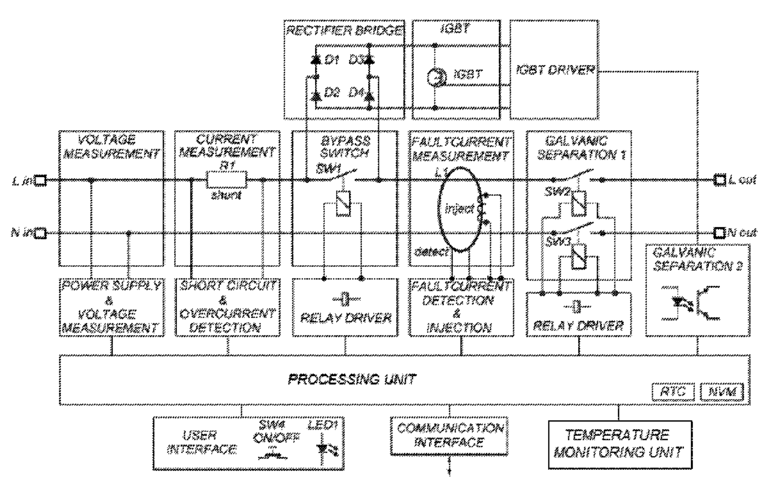

(58) Field of Classification Search

CPC .. H01H 2083/201; H01H 33/00; H01H 33/04; H01H 33/06; H01H 33/16; H01H 33/161; H01H 33/165; H01H 33/167; H01H 33/44; H01H 33/59; H01H 33/593; H01H 33/596; H01H 73/045; H01H 75/00; H01H 75/02; H01H 75/04; H01H 75/06; H01H 75/08; H01H 75/10; H01H 75/12; H01H 77/00; H01H 77/02; H01H 83/00; H01H 83/10; H01H 83/12; H01H 83/14; H01H 83/16; H01H 83/20; H01H 83/22; H01H 89/00; H01H 9/0271; H01H 9/14; H01H 9/30; H01H 9/34; H01H 9/38; H01H 9/42; H01H 9/46; H01H 9/54; H01H 9/541; H01H 9/542; H01H 9/547; H01H 9/56; H02H 1/0015; H02H 3/023; H02H 3/06; H02H 3/063; H02H 3/066; H02H 3/07; H02H 3/105; H02H 3/16; H02H 3/24; H02H 3/243; H02H 3/247; H02H 3/253; H02H 7/0856; H02H 7/222; H02H 9/005; H02H 9/021; H02H 9/025; H02H 9/047

USPC .................................. 361/2–13, 42, 92, 93.4

See application file for complete search history.

(56) References Cited

U.S. PATENT DOCUMENTS

| | | | | |
|---|---|---|---|---|
| 3,711,759 | A * | 1/1973 | Krauthamer | H02H 7/1227 333/175 |
| 3,878,436 | A | 4/1975 | Bogel | |
| 5,650,901 | A * | 7/1997 | Yamamoto | H01H 9/542 361/100 |
| 6,643,112 | B1 * | 11/2003 | Carton | H01H 9/54 218/3 |
| 7,262,945 | B2 * | 8/2007 | Galang | H02H 3/207 361/90 |
| 9,947,496 | B2 * | 4/2018 | Niehoff | H01H 9/542 |
| 2007/0121257 | A1 * | 5/2007 | Maitra | H01H 9/542 361/2 |
| 2010/0328828 | A1 | 12/2010 | Xu | |
| 2011/0063759 | A1 * | 3/2011 | Billingsley | H01H 9/541 361/1 |
| 2012/0249151 | A1 * | 10/2012 | Dobusch | H01H 83/144 324/424 |
| 2016/0301204 | A1 * | 10/2016 | Niehoff | H02H 3/24 |
| 2016/0314928 | A1 * | 10/2016 | Niehoff | H01H 83/04 |

FOREIGN PATENT DOCUMENTS

| | | | | |
|---|---|---|---|---|
| CN | 102157911 | A | 8/2011 | |
| EP | 1014526 | A2 | 6/2000 | |
| EP | 1569314 | A1 | 8/2005 | |
| EP | 1580859 | A2 | 9/2005 | |
| EP | 2320535 | A1 * | 5/2011 | H01H 71/1081 |
| WO | WO 9111013 | A1 | 7/1991 | |
| WO | WO 2009043807 | A2 | 4/2009 | |
| WO | WO 2011018113 | A1 | 2/2011 | |
| WO | WO 2012136274 | A2 | 10/2012 | |

* cited by examiner

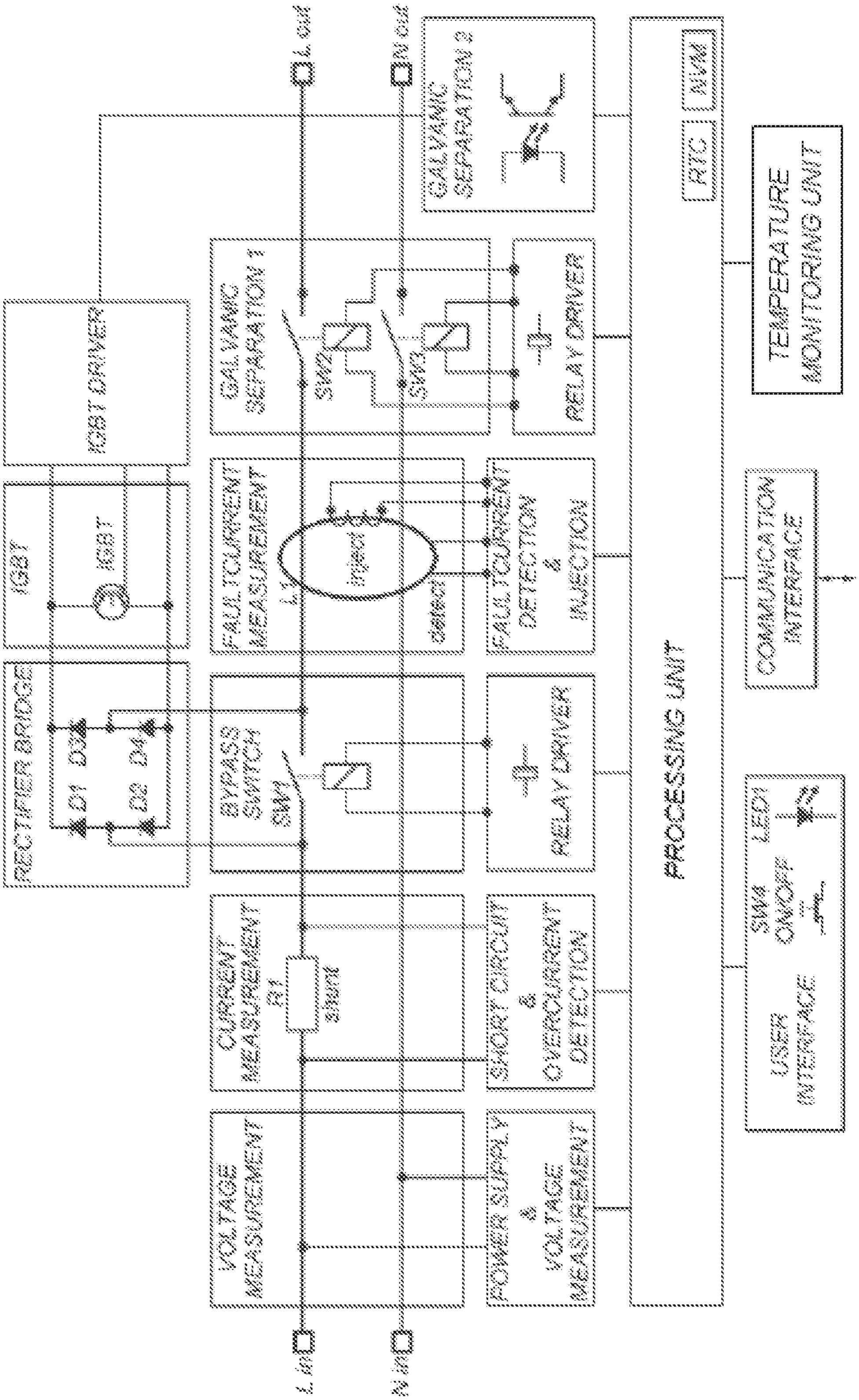
L out
N out
L in
N in
VOLTAGE MEASUREMENT
POWER SUPPLY & VOLTAGE MEASUREMENT
CURRENT MEASUREMENT
R1
shunt
SHORT CIRCUIT & OVERCURRENT DETECTION
RECTIFIER BRIDGE
D1
D2
D3
D4
BYPASS SWITCH
SW1
RELAY DRIVER
IGBT
IGBT
IGBT DRIVER
FAULTCURRENT MEASUREMENT
L1
inject
detect
FAULTCURRENT DETECTION & INJECTION
GALVANIC SEPARATION 1
SW2
SW3
RELAY DRIVER
GALVANIC SEPARATION 2
PROCESSING UNIT
RTC
NVM
TEMPERATURE MONITORING UNIT
COMMUNICATION INTERFACE
USER INTERFACE
SW4 ON/OFF
LED1

AUTOMATIC RECLOSING ALTERNATING CURRENT CIRCUIT BREAKER

CROSS-REFERENCE TO RELATED APPLICATIONS

This application is a U.S. national stage application under 35 U.S.C. § 371 of International Application No. PCT/EP2014/076606, filed on Dec. 4, 2014, and claims benefit to British Patent Application No. GB 1 321 401.0, filed on Dec. 4, 2013. The International Application was published in English on Jun. 11, 2015, as WO 2015/082632 A1 under PCT Article 21(2).

FIELD

The present invention relates to an alternating current circuit breaker.

BACKGROUND

International patent publication WO2009/043807 discloses an electrical device for low-voltage applications, arranged to automatically reclose a residual current circuit breaker after tripping. This is implemented using a separate device which is able to mechanically actuate a resetting lever on the residual current device.

European patent publication EP-A-1 569 314 discloses an automatic reclosing device, wherein a reset device first checks whether a connected load still has a leakage current before reclosing an associated circuit breaker.

SUMMARY

An aspect of the invention provides an alternating current circuit breaker, comprising: a live line between a live supply connecting terminal and a live load connecting terminal; a neutral line between a neutral supply connecting terminal and a neutral load connecting terminal configured to connect an alternating current load to a mains supply; a first galvanic separation switch and a bypass switch in the live line; a second galvanic separation switch in the neutral line, a semiconductor switch element connected parallel to the bypass switch; a processing unit configured to control the first and second galvanic separation switch, the bypass switch, and the semiconductor switch element; and a short circuit and overcurrent detection unit connected to the processing unit for determining a short circuit situation or overcurrent situation. The processing unit is further configured to trip the alternating current circuit breaker by opening the bypass switch and semiconductor switch element after determination of a short circuit or overcurrent situation. The processing unit is further configured to execute a reclosing attempt after a predetermined time period after tripping of the circuit breaker, wherein the predetermined time period is dependent on a situation causing the tripping of the circuit breaker.

BRIEF DESCRIPTION OF DRAWINGS

The present invention will be described in even greater detail below based on the exemplary FIGURES. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a block diagram of an embodiment of an alternating current circuit breaker according to an embodiment of the present invention.

DETAILED DESCRIPTION

An aspect of the present invention provides an improved alternating current circuit breaker providing an automatic reclosing function which still guarantees robustness, reliability and safety of the circuit breaker, in a multitude of possible scenarios.

An aspect of the present invention relates to an alternating current circuit breaker, comprising a live line between a live supply connecting terminal and a live load connecting terminal, and a neutral line between a neutral supply connecting terminal and a neutral load connecting terminal for connecting an alternating current load to a mains supply, a first galvanic separation switch and a bypass switch in the live line, and a second galvanic separation switch in the neutral line, and a semiconductor switch element connected parallel to the bypass switch.

According to an aspect of the present invention, an alternating current circuit breaker is provided, comprising a processing unit arranged to control the first and second galvanic separation switch, the bypass switch and the semiconductor switch element, the alternating current circuit breaker further comprising a short circuit and overcurrent detection unit connected to the processing unit for determining a short circuit situation or overcurrent situation, wherein the processing unit is further arranged for tripping the alternating current circuit breaker by opening the bypass switch and semiconductor switch element after determination of a short circuit or overcurrent situation, and to execute a reclosing attempt after a predetermined time period after tripping of the circuit breaker, wherein the predetermined time period is dependent on the type of situation causing the tripping of the circuit breaker.

The inventive embodiments as described in more detail below, allow to provide a circuit breaker with an automatic reclosing function, which is programmable in order to provide an optimized reclosing action dependent on the specific situation leading to the initial tripping if the circuit breaker.

In electrical installations, miniature circuit breakers (MCB) are used as safety devices. In other applications also residual current devices (RCD) are used. The inventive embodiments of an alternating current circuit breaker relate to both of these classes of commercially available devices, and specifically the mode of operation thereof. In general terms, the present invention embodiments provide for a device which automatically tries to restore the power after a failure in the load or distribution system wiring by a soft-start algorithm. This failure can either be a fault current or overcurrent/short circuit. The behavior of the Automatic Reclosing Device (ARD) part of the present invention alternating current circuit breaker is fully programmable and can be programmed e.g. using an interface. In case a failure occurs this can also been communicated by the interface to e.g. a service technician.

There are ARD's commercially available presently, which are mostly based on the standard for ARD's EN50557. In this standard there are two types of assessments defined (§ 4.3.2); assessment of the prospective residual current and/or assessment of the prospective line current. There are two types of safety precautions defined for the assessment means (§ 4.4): limiting the test voltage (to max. 24 Vac by an isolated transformer § 8.12.2 and § 9.20.1) or limitation of the test current (to max. 1 mAac or 2 mAdc § 8.12.3 and § 9.20.2). A test current is used for testing the prospective residual current (§ 9.20.2), a test voltage for testing the prospective line current. The prescribed assessment means however are difficult to realize, expensive and spacious, therefore ARD functionality according to EN50557 is not suitable in smart RCD's/MCB's for future smart grid and intelligent distribution systems. The above mentioned known ARD's have a traditional overcurrent and short circuit protection system which is in general not fast and robust enough for an added automatic reclosing function by e.g. a motor drive at the main contacts. The traditional short circuit contact and arc-chamber do have only a limited times of short circuit disconnection capability, then the MCB is possibly defective and must be replaced by an installer. For this reason there is an assessment means necessary which already assesses the load circuit before the circuit breaker recloses. If the faulty situation (short circuit or isolation fault) still exists the device will not try to reclose and the assessment can be repeated after some time. The assessment means must have a galvanic separation to the mains distribution network which is realized by a transformer (prescribed in the ARD standard) to have no dangerous voltage on the load during the assessment.

The problem of this limited times of short circuit disconnecting capability is solved by the proposed invention embodiments. In addition the time for the assessment is made that short that there are no significant power interruptions which can disturb other loads or can cause mains distribution network instabilities. Another problem of the assessment using a transformer is to distinguish real short circuits from high capacitive loads e.g. caused by SMPS loads.

Note that an automatic reclosing has the same purpose as a manual reclosing of the MCB/RCD.

In FIG. 1 a block diagram is shown of an embodiment of a circuit breaker according to the present invention. The alternating current circuit breaker comprises a live line between a live supply connecting terminal Lin and a live load connecting terminal Lout, and a neutral line between a neutral supply connecting terminal Nin and a neutral load connecting terminal Nout for connecting an alternating current load to a mains supply AC. The circuit breaker comprises a first galvanic separation switch SW2 and a bypass switch SW1 in the live line, a second galvanic separation switch SW3 in the neutral line, a semiconductor switch element IGBT connected parallel to the bypass switch SW1, and a processing unit arranged to control the first and second galvanic separation switch SW2, SW3, the bypass switch SW1 and the semiconductor switch element. The alternating current circuit breaker further comprises a power supply unit (part of the block Power Supply & Voltage Measurement in FIG. 1) connected to the live supply connecting terminal (Lin) and to the neutral supply connecting terminal (Nin), and connected to the processing unit and further components of the alternating current circuit breaker for providing electrical operating power thereto.

According to a first group of embodiments, an alternating current circuit breaker is provided, further comprising a short circuit and overcurrent detection unit connected to the processing unit for determining a short circuit situation or overcurrent situation (e.g. using the shunt resistor R1 in the live line in the block labeled Current Measurement in FIG. 1). The processing unit is further arranged for tripping the alternating current circuit breaker by opening the bypass switch SW1 and semiconductor switch element IGBT after determination of a short circuit or overcurrent situation, and to execute a reclosing attempt after a predetermined time period after tripping of the circuit breaker, wherein the predetermined time period is dependent (e.g. programmable) on the type of situation causing the tripping of the circuit breaker.

In a further group of embodiments, the alternating current circuit breaker further comprises a fault current detection and injection unit connected to the processing unit for determining a fault current situation, the fault current detection and injection unit being in galvanic separation to the live line and neutral line (e.g. using the coil L1 and transformer as indicated in the block Fault Current Measurement in FIG. 1). The processing unit is further arranged to trip the alternating current circuit breaker after determination of a fault current situation.

In the embodiment shown in FIG. 1, the semiconductor switch element comprises a combination of a rectifier bridge D1-D4 and an isolated gate bipolar transistor IGBT. Alternating current terminals of the rectifier bridge D1-D4 are connected in parallel to the bypass switch SW1, and direct current terminals of the rectifier bridge D1-D4 are connected to an emitter and a collector terminal of the isolated gate bipolar transistor IGBT. The processing unit is connected to a current measurement unit arranged in the live line, and is arranged to control the bypass switch SW1, first and second galvanic separation switches SW2, SW3 and the conducting state of the isolated gate bipolar transistor IGBT in case of detection of a short circuit condition. The control of opening and closing the bypass switch SW1 and first and second galvanic separation switches SW2, SW3 by the processing unit is implemented using respective relay drivers connected to the processing unit as indicated in the block diagram of FIG. 1. Timing can be executed by the processing unit by using the real-time clock (RTC) as shown as an internal component of the processing unit in the block diagram of FIG. 1.

The rectifier bridge D1-D4 is needed since the IGBT is only conducting in one direction (transistor). It must carry the same current as the IGBT, so also a short circuit. Another solution would be to use to 'anti-parallel' IGBT's with series diodes (to carry the reverse voltage in the OFF state of the IGBT), but this would make the complete circuit more complex and expensive.

With the present state of the technology no other semiconductor solutions are possible. There are FET's with a very low channel-resistance, but these are not available as both high voltage/high current type. Triac's and thyristors cannot be used since they are only able to turn off in the zero crossing and this takes too much time. In case of short circuit they cannot be easily forced to switch off and will blow up finally.

GTO's (gate turn off thyristor) and IGCT (integrated gate-commutated thyristor) need a lot of energy to keep them in the ON state and to turn OFF. Also the driver circuit would be much more complex.

The processing unit is arranged to accommodate the measurement inputs, calculation software and output signal logic and drivers. Most time critical processes can be realized by an EPLD or logic ports, but most of the functionality can be integrated in a μP (microprocessor). Primary functions which are included in the processing unit, and which are explained in more detail below where necessary are:

- Mains voltage measurement (via the Power Supply & Voltage Measurement block).

- Mains current measurement & calculating overcurrent characteristic (for replacing the bimetal overcurrent protection).
- Mains voltage & current synchronization.
- Temperature measurement for different components in the MCB (e.g. IGBT and shunt resistor R1).
- Driver logic for the relay drivers (including energy monitor of the storage capacitors).
- Communication to the IGBT driver unit, user interface and communication interface.
- Programming/preset interface for programming (over) current characteristics and a calibration procedure.
- Internal storage of data in case of power interruptions (e.g. contact status, mains current history for the overcurrent protection), using e.g. a non-volatile memory NVM).
- The current measurement is done by a shunt. In an embodiment, the current measurement unit comprises a shunt resistor R1 in the life line and a short circuit and an overcurrent detection unit arranged to measure the voltage across the shunt resistor R1. A shunt is the most logic choice for this application since the accuracy and linearity is superior to other components. Also the size is small and price/availability is reasonable. An alternative would be a Rogowski coil which is also accurate over a wide range and in high current applications. The disadvantage is that a Rogowski coil is much bigger and the output signal is much lower which makes an integrated/combined design for short circuit protection and (small) current/energy measurement more difficult. The value of the shunt resistor R1 must be chosen such that at nominal load current there is a low dissipation, e.g. 45 A/100μΩ⇒0.2 W. The shunt resistor R1 must be capable to withstand the short circuit current for a short time, e.g. 1.5 kA/100μΩ/1.5 ms⇒225 W/0.34 Joule.

The short circuit and overcurrent detection may be implemented using an analog or digital circuit which must be fast enough to detect the short circuit. It also must be accurate enough to sense small load currents for energy measurement purposes. A logical solution is an opamp circuit or integrated (analog ASIC) circuit, but also digital circuits with a high sampling rate are possible.

The alternating current circuit breaker of a further embodiment further comprises an IGBT driver unit connected to the processing unit and a control input of the isolated gate bipolar transistor, wherein the IGBT driver unit is arranged to switch off the isolated gate bipolar transistor in a two-stage process. The IGBT driver unit may further be arranged to monitor the voltage across the IGBT.

The second galvanic separation circuit (Galvanic Separation 2 in the embodiment shown in FIG. 1) comprise one or more optocouplers for communication between the processing and IGBT driver unit. Also a small galvanic separated SMPS may be provided inside the IGBT driver unit to supply the IGBT driver circuit since this driver circuit is on another voltage potential than the other circuit parts of the circuit breaker.

The IGBT driver unit contains the following functions (possibly as separate circuits):

- Two step output driver of the IGBT
- Voltage (de-saturation) monitor of the IGBT collector-emitter voltage
- Bypass switch status monitor
- IGBT driver monitor
- IGBT ON/OFF input For turning off the IGBT in case of a short circuit disconnection, the IGBT driver unit will decrease the gate voltage of the IGBT in two steps. This action avoids both dangerous overvoltage across the IGBT, and SOA problems, especially at short circuit turn-off. The turn-off delay is about 1 μs; in this time the voltage level of the gate will be about half the normal on-voltage.

The bypass switch status monitor function detects whether the bypass switch SW1 is closed; this is done by checking the voltage across the IGBT. The status information of SW1 is forwarded to the processing unit, and can then be used for the delayed turn-off command for the IGBT in case of a short circuit.

The IGBT driver monitor checks power supply voltage of the driver circuit, this is forwarded to the processing unit. If this voltage is too low the IGBT will be in the off-state and this is a fail situation in normal operation.

The IGBT ON/OFF input receives the ON/OFF command from the processing unit.

In a further embodiment, the alternating current circuit breaker further comprises a user interface connected to the processing unit. The user interface e.g. comprises a test switch SW4 and a status indicator. The user interface is e.g. only a push button or a toggle switch with some LEDs to signal the status of the MCB (Powered/ON/OFF/failure etc.).

Furthermore, the alternating current circuit breaker may comprise a communication interface connected to the processing unit, allowing remote operation and monitoring. The communication interface is used to send all possible data to any medium (e.g. bus-system, internet or RS485), wired or wireless (RF/IR).

Note that the configuration from the diagram shown in FIG. 1 and described herein is a 1 pole+N configuration (only overcurrent and short circuit protection in the phase). If a 2 pole device is needed a second bypass switch, overvoltage protection, rectifier bridge, snubber, IGBT and IGBT driver are included in a further embodiment. Also more complex configurations of the mains supply with multiple poles (e.g. 3 phase, 3 phase+neutral, or even 4 phase) can be accommodated by further embodiments with associated additional components.

In normal operation the present invention circuit breaker is in the on state, this means that all loads are supplied. If a failure occurs in one of the loads (e.g. a fault current, overcurrent or short circuit), the circuit breaker will disconnect the loads according to the behavior and disconnecting times specified by standards. In some cases however a power failure or disconnection of the load can be unwanted and lead to process disturbances or high costs. Also more and more uninterrupted power distribution is requested and required and system fails are often not acceptable. Examples of unwanted power failures are fridges, offices (where many people cannot work because of absence of the mains voltage), data centers, traffic lights etc. Not in every case a service technician will be available in a short time.

As described above in general terms, it is depending on which type of failure occurs whether the reclosing of the circuit breaker has any sense. E.g. if a too high earth-leakage occurs in a traffic light installation due to e.g. lightning strikes, reclosing can be very useful. In this situation the risk for the traffic is minimized and there is no need for a service technician to come.

Another example is a failure due to too high inrush current caused by switching on electronic HF-lighting control gear (HF=High Frequency). If a lot of these HF-devices are connected to one circuit breaker the inrush current can be several hundreds of amperes which can lead to unwanted tripping of the circuit breaker. In this situation an automatic (soft-start) reclosing of the circuit breaker is also very useful.

In one embodiment a reclosing attempt comprises closing of the semiconductor switch element (IGBT) first, monitoring for a possible short circuit or overcurrent situation, and only if no short circuit or overcurrent situation exists, closing the bypass switch SW1.

On the other hand there are also situations where failures are remaining and persistent, e.g. isolation failures. In this situation a reclosing trial would directly lead to another disconnection. In a further embodiment, the processing unit is arranged to stop reclosing attempts after a predetermined number of unsuccessful reclosing attempts.

The present invention embodiments of the alternating current circuit breaker provide a capability of programmable and intelligent reclosing scenarios. With the term 'an intelligent reclosing behavior' it is meant that depending on the type of failure the reclosing (interval) time can be chosen/changed by software algorithms in the processing unit. If e.g. an overcurrent slowly increases above the nominal value a fast reclosing trial would be not very successful. The same situation is applicable for a slowly increasing fault current. In such cases a preventive warning signal to a service technician would probably more smart. In such situations also a reclosing trial after a longer period is more successful since the time constant of the failure-change is also long. In case of failures due to fault currents there is the risk of direct human contact. In these situation a fast reclosing would be also be not logical. However when it is a capacitive fault current (this can be seen at the phase angle of the fault current), this would not be a human body fault current and in this situation a fast reclosing trial would be logical.

In other words, the processing unit is arranged to monitor the actual load current I and load current increasing speed dI/dt using the short circuit and overcurrent detection unit prior to tripping of the circuit breaker, and if the load current increasing speed dI/dt is below or equal to a preset threshold value, to select a first time period as predetermined time period, and if the load current increasing speed dI/dt is above the preset threshold value, to select a second time period as predetermined time period, the first time period being longer than the second time period.

The first, longer period, is thus selected in case of a slowly increasing overcurrent/fault current, and a second, shorter time period in case of e.g. pulse earth leakage (lightning strike), or too high inrush currents.

Similar to the miniature circuit breaker embodiments already described above, also in the case of a residual current device embodiment, a reclosing attempt may comprise closing of the semiconductor switch element IGBT first, monitoring for a possible fault current situation, and only if no fault current situation exists, closing the bypass switch SW1.

In a further embodiment the processing unit is thus arranged to monitor a test current and voltage using the fault current detection and injection unit after tripping of the circuit breaker, and if the fault current is determined to be a capacitive fault current to select a short time period as predetermined time period.

In some other situations, e.g. when the panel board is not accessible by the users (industry, houses for people with a mental handicap) also a remote reclose option is imaginable. This can be done e.g. by a service engineer after he got a failure message via the communication interface of the present invention circuit breaker embodiments or directly from the users. If programmed he can see the logging of the circuit breaker according to the present invention and perform an analysis and decide to do a remote reclose. As already described above, the alternating current circuit breaker may further comprise a communication interface connected to the processing unit. The processing unit is e.g. arranged to execute a reclosing attempt based on instructions received via the communication interface. The processing unit may be further arranged to send a tripping message via the communication interface to an external recipient. In an even further embodiment the processing unit is arranged to send logging data of the circuit breaker via the communication interface.

Also an reclosing scenario based on external parameters is imaginable (i.e. based on data received via the communication interface). E.g. automatic reclosing may not occur after an earth fault when there are people in the building or at preprogrammed time schedules. Or e.g. the automatic reclosing function is disabled in case electrical system tests are performed. In this embodiment, the processing unit is arranged to execute a reclosing attempt based on external data received via the communication interface.

For a lot of load types and situations there are different kind of reclosing scenarios. Within the system hierarchy of the present invention circuit breaker a lot of scenarios could be programmed as preset or manually changed by end-user/service engineer.

In specific embodiments, situations are accommodated requiring reclosing after a short circuit. This is a special situation because in this situation the reclosing is most critical. Conventional MCB's can only disconnect a few short circuits and then they must be exchanged by an installer/service engineer. It is also not a nice experience for an end-user to manually switch on an MCB at an existing short circuit. Although there is no personal risk involved, the energy which must be disconnected by the MCB can be high which can cause unpleasant/frightening bangs and/or flashes.

As already explained above Automatic Reclosing Devices (RCD) according to EN50557 do have an assessment means to prevent from unwanted reclosing in case of an still existing short circuit. This would damage the MCB part of the ARD and this would decrease the life-time of the ARD dramatically. A short circuit disconnection by a traditional MCB takes also some time, up to several ms is normal, which would also probably disturb other loads or processes, could extra age upstream fuses and stress cables in the distribution panel, and overload the power supply source unnecessary.

In the present invention embodiments of the circuit breaker this reclosing at an existing short circuit is implemented differently. The present invention circuit breaker in the miniature circuit breaker has no pre-asses means available, so this also will not delay the reclosing. If the processing unit decides to reclose, first the IGBT will be closed in the zero-crossing of the mains voltage. If the short circuit is still existing, this will be immediately detected by the short circuit detection circuit. Depending on the prospective short circuit this can be already within e.g. 100 μs because this detection circuit does not only measure the actual current, but also dI/dt. The dI/dt (load current increasing speed) is a measure for the load resistance. If the processing unit recognizes that the short circuit is still present it will switch off the IGBT within some is so the total 'on-time' of the automatic reclosing device is only up to about e.g. 100 μs. Also the involved disconnecting energy is by this principle much lower than at a traditional MCB mechanism.

Note that also the bypass relay SW1 is still not closed, so is also not yet involved at reclosing an short circuit. Thus, in a further embodiment of the present invention an alternating current circuit breaker is provided, wherein the processing unit is further arranged to detect a short circuit situation using the short circuit and overcurrent detection unit, and if a short circuit situation is detected, executing a short circuit reclosing attempt by:

closing the semiconductor switch element IGBT in a zero-crossing of the mains supply;

detecting if a short circuit situation still exists using the short circuit and overcurrent detection unit (by measuring the actual current I, and the load current increasing speed dI/dt), and if the short circuit situation still exists, open the semiconductor switch IGBT directly, or if the short circuit situation is not detected, further resuming the reclosing attempt of the circuit breaker.

In a further embodiment, the alternating current circuit breaker further comprises a temperature monitoring unit connected to the processing unit and in thermal contact with the semiconductor switch element IGBT, wherein the processing unit is arranged to halt reclosing attempts when a temperature of the semiconductor switch element IGBT is above a preset temperature threshold value. Because the temperature of the IGBT is constantly monitored and the hybrid switch can do thousands of reclosing trials against short circuit, this is a very robust solution. Because the time frame of the reclosing trial is that short (e.g. <100 μs) other loads will not being disturbed and the mains distribution network will not be overloaded.

It is noted that the above described embodiments can also be applied in the multiple pole configurations as described above. E.g. in a 3 phase system (i.e. a 4 pole device) it is possible to reclose only one pole if an earth fault or short-circuit is detected in that single pole only.

The present invention embodiments have been described above with reference to a number of exemplary embodiments as shown in the drawings. Modifications and alternative implementations of some parts or elements are possible, and are included in the scope of protection as defined in the appended claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. An alternating current circuit breaker, comprising:

a live line between a live supply connecting terminal and a live load connecting terminal;

a neutral line between a neutral supply connecting terminal and a neutral load connecting terminal configured to connect an alternating current load to a mains supply;

a first galvanic separation switch and a bypass switch in the live line;

a second galvanic separation switch in the neutral line;

a semiconductor switch element connected parallel to the bypass switch;

a processing unit configured to control the first and second galvanic separation switches, the bypass switch, and the semiconductor switch element; and a short circuit and overcurrent detection unit connected to the processing unit for determining a short circuit situation or overcurrent situation, wherein the processing unit is further configured to trip the alternating current circuit breaker by opening the bypass switch and semiconductor switch element after determination of a short circuit or overcurrent situation, wherein the processing unit is further configured to execute a reclosing attempt after a predetermined time period after tripping of the alternating current circuit breaker, wherein the predetermined time period is dependent on a situation causing the tripping of the alternating current circuit breaker, and wherein the reclosing attempt comprises:

closing the semiconductor switch element first, monitoring, using the short circuit and overcurrent detection unit, for a possible short circuit or overcurrent situation, and only if no short circuit or overcurrent situation exists, closing the bypass switch.

2. The alternating current circuit breaker of claim 1, wherein the processing unit is configured to monitor the actual load current I and load current increasing speed dI/dt using the short circuit and overcurrent detection unit prior to the tripping of the alternating current circuit breaker, and if the load current increasing speed dI/dt is below or equal to a preset threshold value, to select a first time period as predetermined time period, and if the load current increasing speed dI/dt is above the preset threshold value, to select a second time period as predetermined time period, the first time period being longer than the second time period.

3. The alternating current circuit breaker of claim 1, wherein the processing unit is further configured to detect a short circuit situation using the short circuit and overcurrent detection unit, and if a short circuit situation is detected, execute a short circuit reclosing attempt by:

closing the semiconductor switch element in a zero-crossing of the mains supply;

detecting if a short circuit situation still exists using the short circuit and overcurrent detection unit, and if the short circuit situation still exists, open the semiconductor switch directly;

if the short circuit situation is not detected, further resuming the reclosing attempt of the alternating current circuit breaker.

4. The alternating current circuit breaker of claim 1, further comprising:

a fault current detection and injection unit connected to the processing unit, configured to determine a fault current situation, the fault current detection and injection unit being in galvanic separation to the live line and neutral line, wherein the processing unit is further configured to trip the alternating current circuit breaker after determination of a fault current situation.

5. The alternating current circuit breaker of claim 4, configured to operate such that a reclosing attempt comprises:

closing of the semiconductor switch element first, monitoring for a possible fault current situation, and only if no fault current situation exists, closing the bypass switch.

6. The alternating current circuit breaker of claim 4, wherein the processing unit is configured to monitor a test current and voltage using the fault current detection and injection unit after tripping of the alternating current circuit breaker, and if the fault current is determined to be a capacitive fault current to select a short time period as predetermined time period.

7. The alternating current circuit breaker of claim 1, wherein the processing unit is configured to stop reclosing attempts after a predetermined number of unsuccessful reclosing attempts.

8. The alternating current circuit breaker of claim 1, further comprising:

a communication interface connected to the processing unit, wherein the processing unit is configured to execute a reclosing attempt based on instructions received via the communication interface.

9. The alternating current circuit breaker of claim 8, wherein the processing unit is configured to send a tripping message via the communication interface to an external recipient.

10. The alternating current circuit breaker of claim 8, wherein the processing unit is configured to send logging data of the alternating current circuit breaker via the communication interface.

11. The alternating current circuit breaker of claim 8, wherein the processing unit is configured to execute a reclosing attempt based on external data received via the communication interface.

12. The alternating current circuit breaker of claim 1, further comprising:

a temperature monitoring unit connected to the processing unit and in thermal contact with the semiconductor switch element, wherein the processing unit is configured to halt reclosing attempts when a temperature of the semiconductor switch element is above a preset temperature threshold value.

13. An alternating current circuit breaker, comprising:

a live line between a live supply connecting terminal and a live load connecting terminal;

a neutral line between a neutral supply connecting terminal and a neutral load connecting terminal configured to connect an alternating current load to a mains supply;

a first galvanic separation switch and a bypass switch in the live line;

a second galvanic separation switch in the neutral line;

a semiconductor switch element connected parallel to the bypass switch;

a processing unit configured to control the first and second galvanic separation switches, the bypass switch, and the semiconductor switch element;

a short circuit and overcurrent detection unit connected to the processing unit for determining a short circuit situation or overcurrent situation; and a fault current detection and injection unit connected to the processing unit, configured to determine a fault current situation, the fault current detection and injection unit being in galvanic separation to the live line and neutral line, wherein the processing unit is further configured to trip the alternating current circuit breaker by opening the bypass switch and semiconductor switch element after determination of a short circuit or overcurrent situation, wherein the processing unit is further configured to execute a reclosing attempt after a predetermined time period after tripping of the alternating current circuit breaker, wherein the predetermined time period is dependent on a situation causing the tripping of the circuit breaker, and wherein the processing unit is further configured to trip the alternating current circuit breaker after determination of a fault current situation.

14. An alternating current circuit breaker, comprising:

a live line between a live supply connecting terminal and a live load connecting terminal;

a neutral line between a neutral supply connecting terminal and a neutral load connecting terminal configured to connect an alternating current load to a mains supply;

a first galvanic separation switch and a bypass switch in the live line;

a second galvanic separation switch in the neutral line;

a semiconductor switch element connected parallel to the bypass switch;

a processing unit configured to control the first and second galvanic separation switches, the bypass switch, and the semiconductor switch element;

a short circuit and overcurrent detection unit connected to the processing unit for determining a short circuit situation or overcurrent situation; and a communication interface connected to the processing unit, wherein the processing unit is further configured to trip the alternating current circuit breaker by opening the bypass switch and semiconductor switch element after determination of a short circuit or overcurrent situation, wherein the processing unit is further configured to execute a reclosing attempt after a predetermined time period after tripping of the alternating current circuit breaker, wherein the predetermined time period is dependent on a situation causing the tripping of the circuit breaker, and wherein the processing unit is configured to execute a reclosing attempt based on instructions received via the communication interface.

* * * * *